United States Patent [19]

Beusch et al.

[11] 4,190,068
[45] Feb. 26, 1980

[54] SELF-CORRECTING LINEARLY MOVABLE IRRIGATION SYSTEM

[75] Inventors: Glenn A. Beusch, Post Falls, Id.; Harold L. Thompson, Spokane, Wash.; Herbert E. Lindner, Spokane, Wash.; Geoffrey G. Jones, Spokane, Wash.

[73] Assignee: Gifford-Hill & Company, Inc., Tulsa, Okla.

[21] Appl. No.: 835,877

[22] Filed: Sep. 23, 1977

[51] Int. Cl.$^2$ .............................................. B05B 3/18
[52] U.S. Cl. ..................................... 137/1; 137/344; 239/184; 239/212
[58] Field of Search ............... 137/1, 344; 239/184, 239/212

[56] References Cited

U.S. PATENT DOCUMENTS

| 3,587,763 | 6/1971 | Kinkead | 137/344 X |
| 3,608,827 | 9/1971 | Kinkead | 137/344 X |
| 3,707,164 | 12/1972 | Clemons | 137/344 |
| 3,726,478 | 4/1973 | McMurray | 137/344 X |
| 3,974,845 | 8/1976 | Indresaeter | 137/344 X |

Primary Examiner—Gerald A. Michalsky
Attorney, Agent, or Firm—James L. Jackson

[57] ABSTRACT

A linearly movable irrigation system, according to the present invention, may include a plurality of interconnected power driven irrigation spans supporting a water supply conduit, which sections are capable of moving over a land area and depositing a controlled amount of water thereon. At one extremity of the irrigation system may be provided a steerable and powered mover unit that accepts water from a water supply system and conducts it to the overhead irrigation pipe under sufficient pressure to cause proper distribution of water through sprinkler devices located along the length of the irrigation conduit. A power driven pump may be supported by the steerable mover unit in order to pressurize or provide boosting pressure for the water received from the water supply. The steerable mover unit is adapted to steerably move in proximity to an elongated reference which may be straight or curved as desired. The steerable mover unit is provided with means for sensing stresses and angular relationship of the irrigation spans relative to the steerable mover unit for providing control signals to the irrigation system that maintain stresses and angular misalignment of the system within an acceptable range. Each extremity of the irrigation system may move at different average speeds which are determined by the control signals for corrective relative movement. The extremities of the irrigation system may also move simultaneously at equal speeds or at different speeds to accomplish controlled movement during irrigation operations.

24 Claims, 7 Drawing Figures

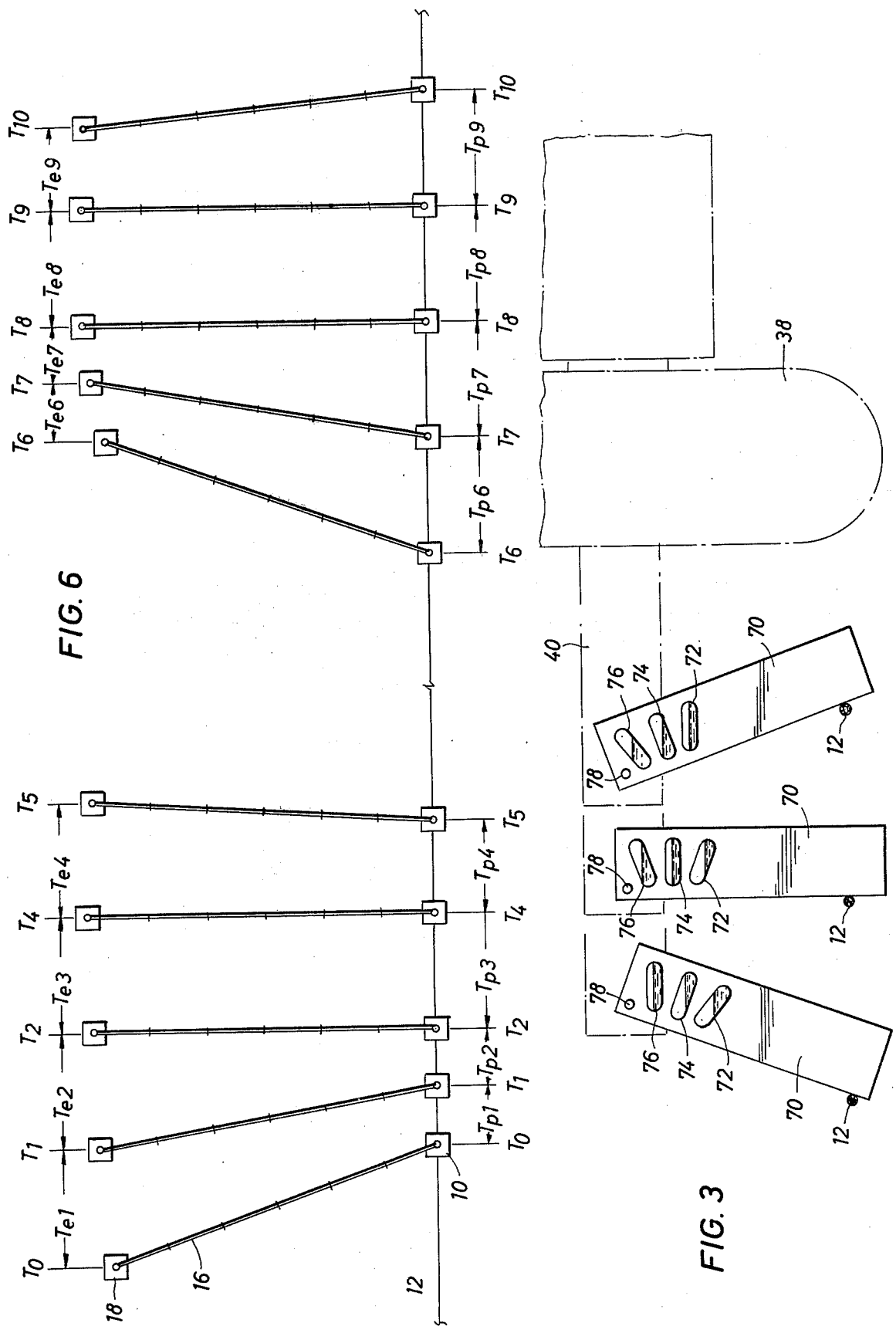

SELF-CORRECTING LINEARLY MOVABLE IRRIGATION SYSTEM

FIELD OF THE INVENTION

This invention is directed generally to irrigation systems for irrigating large land areas and more specifically is directed to elongated irrigation systems that move in substantially controlled manner over a land area to accomplish irrigation of the land area. More specifically, the present invention is directed to an irrigation system that extracts water from an elongated water supply source, such as a ditch or water pipe, for the purpose of irrigation and which irrigation system is automatically movable and automatically steered over a land area for extended lengths of time without any requirement for significant attention by personnel.

BACKGROUND OF THE INVENTION

A valuable asset to the irrigation industry has been the development of irrigation systems that travel while sprinkling large land areas with water and require virtually no personnel attention during operation. Substantial elimination of the labor costs that were earlier required has greatly enhanced the commercial success of large field irrigation. Although many different types of irrigation systems have been developed over the years, the type of irrigation system that is most prevalent is the circular irrigation system which incorporates a plurality of sprinkler pipe sections that are each supported by a mechanism for inducing movement to the pipe sections. In circular irrigation systems a central pivot tower is provided that also serves as a water supply and one extremity of the irrigation system is connected thereto causing the entire irrigation system to revolve about the pivot during continuous irrigation operations. Although circular irrigation systems have been quite successful, it is clear that greater crop yields and lower cost irrigation would be achieved if the irrigation system were capable of irrigating rectangular land areas or other specifically shaped land areas as opposed to circular areas. One attempt to accomplish more rectangular irrigation through the use of circular irrigation systems is through the use of corner irrigation spray devices that are activated only during four small segments of each revolution of the irrigation system. Although the increase of land area irrigation through the use of irrigation guns is not insubstantial, it would nevertheless be commercially desirable to provide an irrigation system that was capable of irrigating the entirety of a large rectangular land area.

In the past, irrigation systems have been developed for irrigation of rectangular fields, but in order to provide for proper operation of the irrigation system, it is generally deemed necessary that a plurality of tracks or guideways be provided in order to physically guide the irrigation system over the land area. Of the number of patented devices that have been developed with track or guideway control in mind, U.S. Pat. No. 3,608,827, to Kinkead is typically representative. Linearly movable irrigation systems have also been developed that do not necessitate the use of tracks or guideways such as taught by U.S. Pat. No. 3,613,703, to Stout which utilizes a guide rail 52 for reference during movement over a land area and traverses by alternate movement and pivoting of each of the ends of the system. In the case of the structure identified in the patent to Stout the ambulatory irrigation system is so arranged and controlled that each end of the composite line alternately can be caused to travel a predetermined distance along an arcuate path with the opposite end of the composite line temporarily being substantially at the center of curvature of the arcuate path and with the entire line thus swinging forwardly in alternate angular direction as it moves over the land area. More simply, one extremity of the irrigation system remains static and serves as a pivot during a portion of the movement and the sequence is then reversed causing the other extremity to remain static while the first extremity is caused to move. The ends of the system are not capable of simultaneous movement.

It is considered desirable to provide a linearly movable irrigation system that does not require a track or guideway to control movement thereof such as is the case with Kinkead U.S. Pat. No. 3,608,827 and which does not cause excessive water distribution on certain of the land section such as is likely to occur when each end of the irrigation system alternately moves forward.

U.S. Pat. No. 3,707,164 to Clemons and U.S. Pat. No. 3,974,845 to Indresaeter disclose linearly movable irrigation systems which do not require a track or fixed guideway for control of the system movement. Clemons teaches a method and apparatus for maintaining an irrigation system within predetermined distance from an elongated reference line. In one embodiment, Clemons selectively energizes adjacent tractors to provide a steering action relative to the guide and in another embodiment the tractor wheels are also turned simultaneously to move the irrigation system toward or away from the reference guide. Clemons also teaches maintaining the alignment between adjacent tractors by varying the flow of hydraulic fluid to hydraulic motors on the tractors for speed control. It should be noted that the steering control systems taught by Clemons employ control and power systems at substantially each mobile support unit. Further, the control systems of Clemons are actuated by only a single type of input so that the system response is corrective of only the particular input selected.

U.S. Pat. No. 3,974,845 to Indresaeter teaches an irrigation system which is controlled by stopping and starting mover units located at extremities of the system. As described therein, the control system is provided with inputs functionally related to the linear displacement from the guide reference of the mover unit adjacent the guide reference and to the angular alignment of the irrigation system with respect to the guide reference. The correction of either linear or angular misalignment is accomplished by causing the entire irrigation system to pivot about one extremity or the other to maintain the system within preselected limits. Lateral displacement can be corrected only by a substantial number of correcting manuevers. Further, there is no input signal related to the stresses being developed in the irrigation pipe spans in order to preclude corrective action which could result in excessive system stresses.

Accordingly, it is a primary feature of the present invention to provide a novel linearly movable irrigation system that moves in substantially linear manner over a land area and is capable of irrigating the entirety of a generally rectangular land area or irrigating a land area of an irregular shape.

It is also a feature of the present invention to provide a novel linearly movable irrigation system whereby control of the movement of the system is accomplished by a first control system steering a mover unit adjacent an elongated reference and an independent second control system maintaining the relative rotation of the irrigation pipe spans relative to the steerable mover unit.

It is an even further feature of the present invention to provide a novel linearly movable irrigation system that moves in linearly manner over a land area and, in the event of the occurrence of predetermined misalignment of the irrigation system relative to the reference, the irrigation system is automatically self-steering to maintain its travel within a defined boundary.

It is yet another feature of the present invention to provide a novel linearly movable irrigation system employing sensing devices for determining angular alignment of the irrigation pipe spans with respect to a pivot located on the steerable mover unit and for determining the stresses in the irrigation pipe spans and controlling the angular alignment and stress by movement relative to the steerable mover unit.

It is also an object of the present invention to provide a novel linearly movable powered mover unit adjacent a reference such as an elongated guide surface which may be straight or curved as desired, wherein the powered mover unit is provided with a control mechanism that senses linear displacement of the mover unit relative to the reference for steerably controlling travel of the mover unit relative to the elongated reference.

It is another object of the present invention to provide a novel linearly movable irrigation system in which angular alignment and stresses in the irrigation pipe spans are controlled by movement relative to a powered mover unit and independent from a fixed guide reference.

It is also a feature of the present invention to provide a novel linearly movable irrigation system wherein a plurality of individually supported and driven sections are incorporated into an elongated irrigation system and wherein movement of each of the sections is controlled by its angular relationship with an adjacent irrigation section, such angular relationship control overridden under certain circumstances by control signals received from a power and control portion of the irrigation system.

SUMMARY OF THE INVENTION

The present invention is directed to a linearly movable steerable irrigation system that is adapted to move in substantially linear manner for irrigation of a large generally rectangular land area. The irrigation system is adapted to move automatically in response to its position relative to an elongated reference such as an elongated straight or curved guide surface, guide rail, guide line or guide beam during irrigation operations and in response to the angular alignment and stresses of irrigation pipe spans relative to a powered mover unit adjacent the elongated reference. Sensing apparatus carried by a powered mover unit of the irrigation system is capable of sensing both linear displacement of the mover unit relative to the elongated reference and the angular alignment and stresses of the irrigation pipe spans relative to the powered mover unit and automatically self-correcting the direction of movement in the event the irrigation system has moved beyond allowable limits of linear displacement, angular misalignment or system stresses.

The irrigation system includes a powered mover unit that is provided at one extremity thereof or intermediate the extremities of the system and which will typically be directly connected to linear displacement, angular misalignment, and system stress sensors that determine relative positioning of the irrigation system. To the powered mover unit may be connected a plurality of irrigation sections each comprising an irrigation span that is supported by any suitable mobile support such as wheels, tracks, ambulatory mechanisms, etc. that is capable of accomplishing movement of the irrigation system over the land area. An elongated irrigation conduit being a composite of a number of interconnected sections of irrigation pipe will be supported by the spans above the land area and will cause distribution of water on the land area by means of sprinkler devices carried by the various sections of water supply pipe. Each of the self-driven sections or spans of the irrigation system may be controllably activated and deactivated by the angular relationship thereof to other spans or sections to accomplish controlled movement of the spans of the irrigation system. Conventional angular detection sensors may be employed to detect angular misalignment between the respective sections of the irrigation system. When such angular misalignment reaches a predetermined value, the drive mechanisms controlled by the angular detecting device for each section will be energized causing the drive means to impart driving movement to that particular section of the irrigation system. Such driving will continue until sufficient movement of that section has occurred to change the angular relation detected by the angular detecting device to another predetermined value, at which time the drive mechanism for that irrigation section will be de-energized.

For accomplishing steering control responsive to signals received by the powered mover unit from the linear displacement sensors contacting the elongated reference, steering pistons on a steerable powered mover unit are actuated to rotate the mobile support, such as wheels, and maintain the steerable powered mover unit within preselected displacement limits of the elongated reference. Hence, continuous irrigation system movement can be maintained when minor steering corrections are being made and the system is enabled to promptly respond to correcting signals.

Extending from the steerable mover unit may be a plurality of irrigation pipe spans and a powered mover unit connected substantially at the extremity of the connected pipe spans. The extending pipe spans may be pivotally connected to the steerable mover unit to define a reference for measuring angular alignment of the irrigation spans with the steerable mover unit and for measuring stresses within the pipe spans as a function of the reference pivot. The angular alignment and stresses of the irrigation pipe spans are maintained within preselected limits by varying the average speeds of the steerable mover unit and the outboard mover unit to obtain rotation of the extending pipe spans relative to the pivot. For example, mover unit average speed may be varied by controlling the duration for energizing the mover unit motor over a selected time interval, i.e. controlling the duty cycle of the motor. Varying the duty cycle of the inboard and outboard mover unit motors will produce relative pivotal movement of the outboard unit about the inboard unit. When this relative pivotal movement has continued sufficiently to satisfy the requirements of the control signal, another control signal will be provided causing both extremities of the irrigation system to move at the same or different average speed, causing the entire irrigation system to move in substantially linear or controllably turning manner across the land area. Upon movement of the irrigation system sufficiently to traverse control boundaries defined by the stress and angular misalignment sensors, another control signal will be issued, causing the opposite extremity of the irrigation system to remain static or to be controllably slowed while the other extremity of the irrigation system is allowed to continue moving. The resulting effect is a relative pivoting of the entire irrigation system about the steerable mover unit. In other words, the irrigation system will move across the land area in substantially linear manner unless for some reason it should become over-stressed or angularly misaligned relative to the steerable mover unit. This can be caused by traversing of the irrigation system over undulations in the terrain or by other than straight line positioning of the reference such as might occur if the reference is designed to cause tracking of the irrigation system to irrigate an oval land area.

The present invention is also directed to the method of accomplishing irrigation of land areas, wherein the elongated irrigation system, capable of movement across a land area in substantially linear manner, is also capable of being steered automatically so as to correct any lateral displacement from an elongated reference. The irrigation apparatus, under the novel method of controlling the operation thereof, is capable of irrigating generally rectangular land areas and because of its automatic steering capability, is also capable of traversing land areas that are of irregular configuration. Each extremity of the irrigation system is capable of independent movement responsive to control signals received from a control facility and may move at different speeds, stop, or move at the same speed as the opposite extremity of the irrigation system. Also, the power and control facility for the irrigation apparatus may be located intermediate the extremities of the irrigation system or at either extremity thereof within the teachings of the present invention.

Water supply for the irrigation system may take the form of an elongated ditch from which water is extracted by suction or it may take the form of an elongated closed water supply system such as a pipe having a plurality of water supply connections that are automatically received and released in such manner as to provide substantially continuous water flow as the irrigation system traverses its designated path of travel.

BRIEF DESCRIPTION OF THE DRAWINGS

So that the manner in which the above-recited features, advantages and objects of the present invention as well as others which will become apparent, are obtained and can be understood in detail, more particular description of the invention, briefly summarized above, may be had by reference to the embodiments thereof which are illustrated in the appended drawings, which drawings form a part of this specification. The present invention, both as to its organization and manner of operation may best be understood by way of illustration and example of certain preferred embodiments when taken in conjunction with the accompanying drawings.

IN THE DRAWINGS

Figures 1, 2:
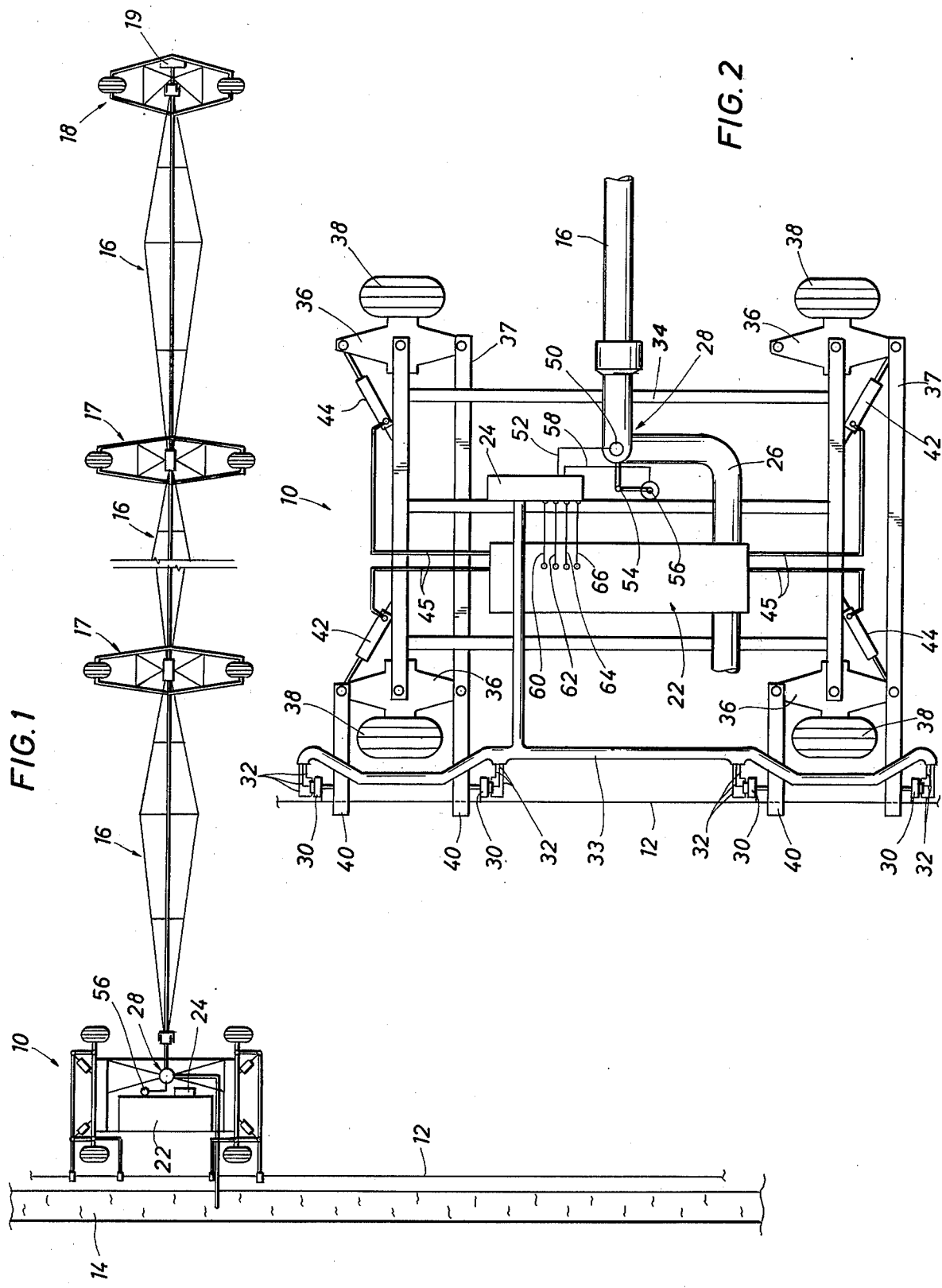

FIG. 1 is a plan view partially in schematic form illustrating a linearly movable irrigation system that is constructed in accordance with the principles of the present invention.

FIG. 2 is a plan view of a motorized steerable mover unit and illustrating the position of the various sensors on the mover unit frame.

FIG. 3 is an elevation view illustrating one embodiment of a displacement sensor for determining the position of the mover unit frame relative to an elongated reference.

Figure 4:
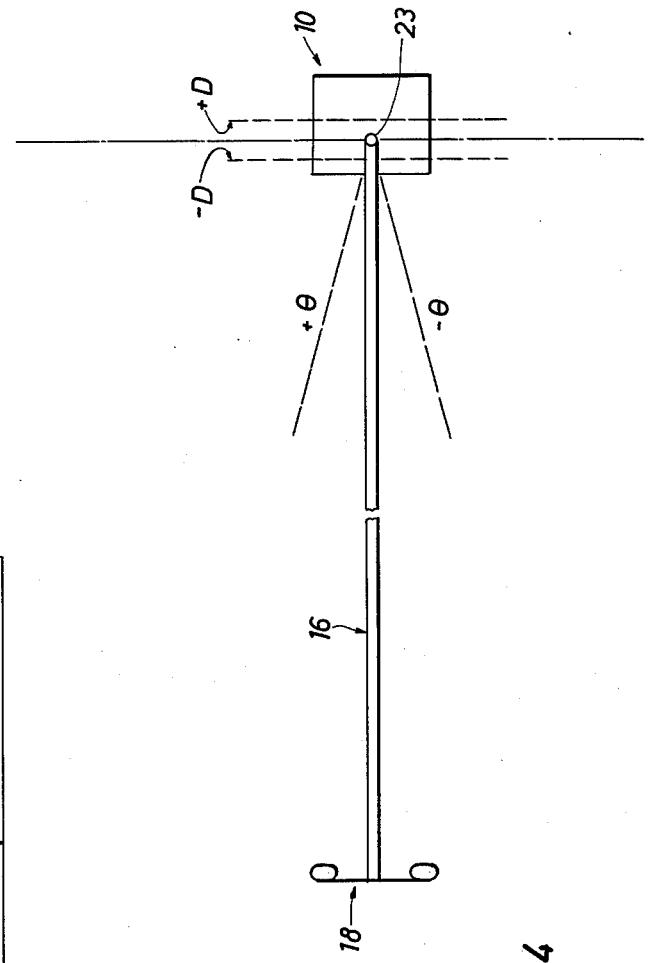

FIG. 4 is a schematic illustration of control system input parameters.

Figure 5:
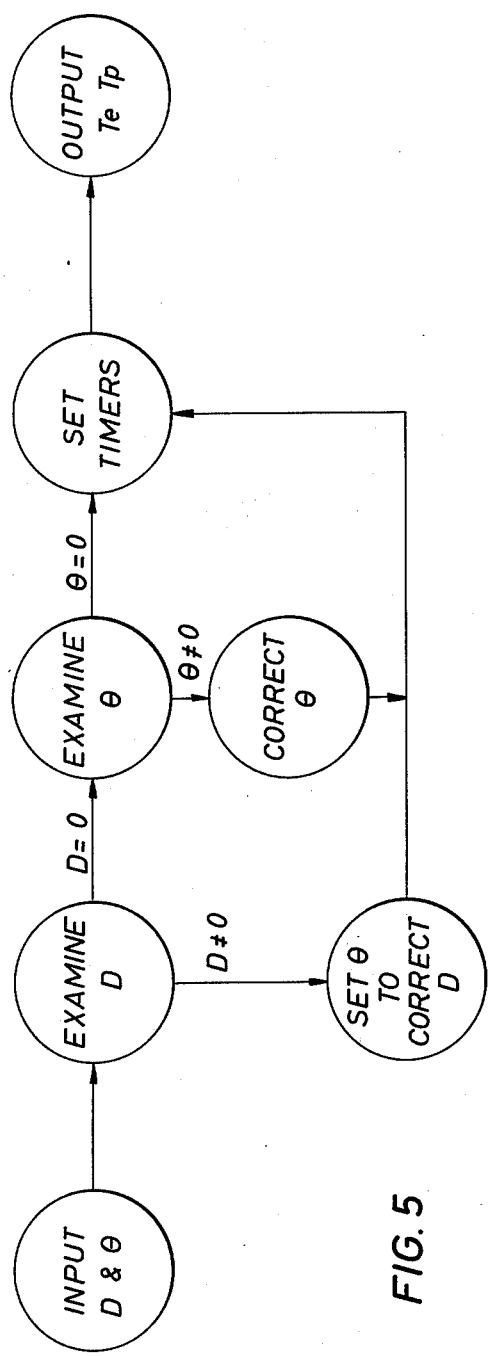

FIG. 5 is a schematic illustration of the basic control system logic.

FIG. 6 is a graphic representation of the track of controlled movement of the irrigation system in response to various input signals.

Figure 7:
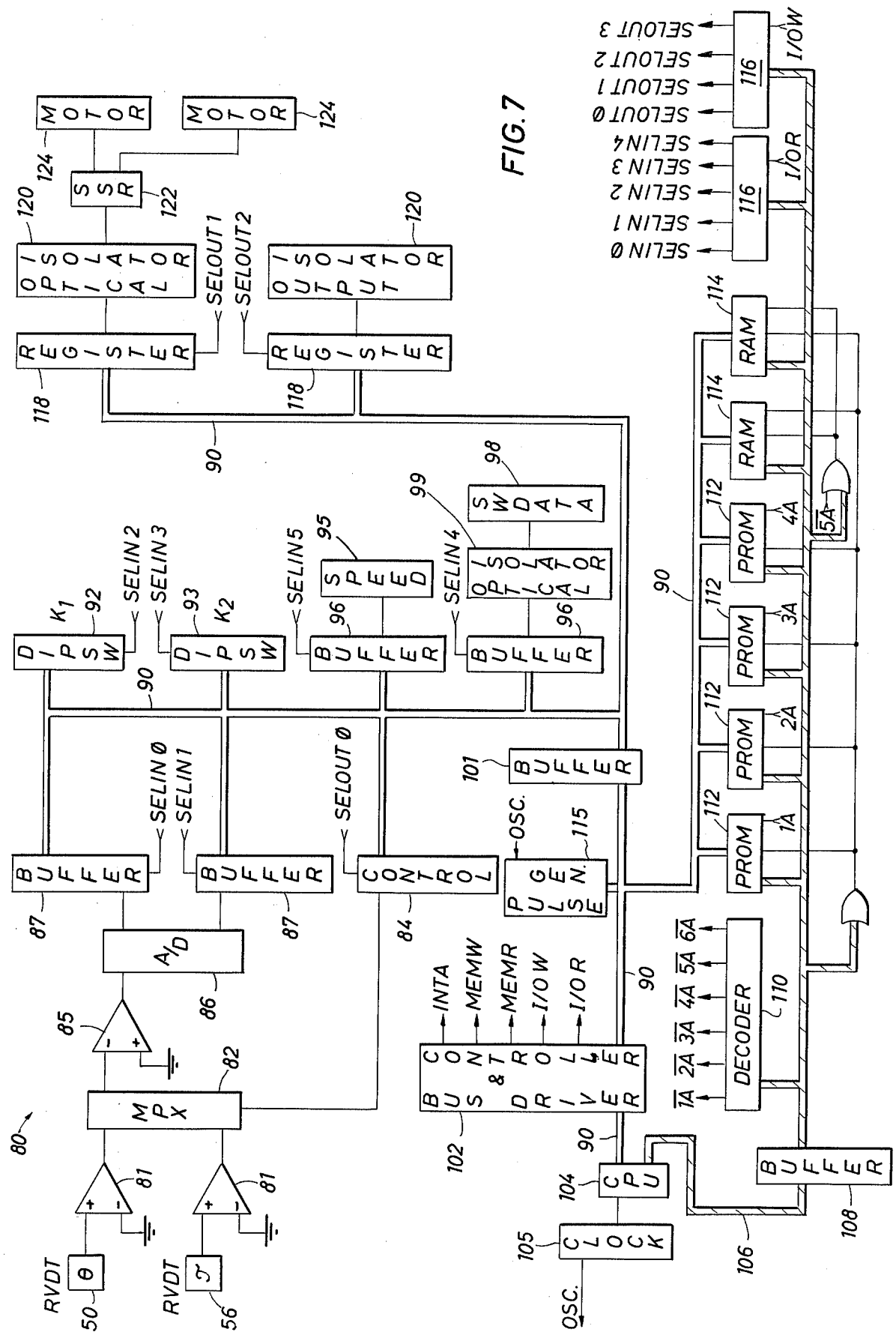

FIG. 7 is a block diagram schematic of a control unit for evaluating input information and determining an appropriate response in accordance with a preferred embodiment of the present invention.

DESCRIPTION OF PREFERRED EMBODIMENTS

Referring now to the drawings and first to FIG. 1, there is depicted a self-driven irrigation system of the type that is adapted to move across a large land area to be irrigated and to follow elongated reference while controlling an extending string of irrigation pipe spans to maintain the stresses in the irrigation pipe spans and the rotation of the elongated string of pipe within predetermined values. As shown in FIG. 1, the irrigation system incorporates a motorized steerable mover unit depicted generally at 10. On the mover unit 10 may be provided an engine, pump, and generator unit 22 providing mechanical and electrical power for operation of the irrigation system. Mover unit 10 is in communication with a water supply source 14 and may extract water from the water supply and transmit it under pressure to a plurality of irrigation spans 16 from which it is evenly distributed on the land surface by a plurality of conventional sprinkler devices that are carried by the irrigation pipe spans.

Extending from the mover unit 10 are a plurality of irrigation sections or spans 16 that comprise a structural framework for support of each of the various sections of irrigation water supply pipe that are interconnected to form the irrigation system. Each of these spans or sections 16 may be supported by a mobile base 17, the respective mobile bases 17 being provided with wheels, tracks, ambulatory devices, etc. in order to provide the mobility that causes the irrigation system to traverse the land area being irrigated. An outboard mover unit 18 is provided preferably adjacent the end of the irrigation span removed from water supply 14. Mover unit 18 may be provided with an individual power means which is controlled so as to permit rotation of the plurality of interconnected irrigation pipe spans 16 with respect to the steerable mover unit 10, as will be hereinafter explained in more detail.

For controlling the track of the irrigation system over the land area, an elongated reference 12 may be provided. The elongated reference may take many suitable forms that enable position sensing devices to react with the reference and steer the steerable mover unit to maintain a predetermined distance between the steerable mover unit and the elongated reference 12. For example, the reference may be a guide rail supported above the ground on posts, it may take the form of a supported guide wire and it may also take the form of a guide surface formed by the water supply, such as an external wall of a concrete lined ditch that is partially embedded in the ground or supported on the surface of the land area. The reference, where a straight line reference is desired, may take the form of a laser beam or other suitable beam that may be appropriately sensed. If the novel sensing device, hereinafter described, which is subject of the present invention is employed, a supported guide wire is the preferred form of the elongated reference 12. While the reference 12 is shown to be in the form of a straight line in FIG. 1, it is not intended to limit the present invention solely to use under conditions where the reference takes the form of the straight line. The reference 12 may be curved in any suitable form that is appropriate for guiding the track of the irrigation system about the land area to be irrigated.

Referring now to FIG. 2, there may be seen a plan view of steerable mover unit 10. A frame 34 is provided which is mounted on a suitable mobile support for traversing a terrain suitable for irrigation, which mobile support may conveniently take the form of wheels 38 supported on axles 36 which are rotatably mounted on frame 34. Wheels 38 may be rotated to steer mover unit 10 either toward or away from elongated reference 12 so as to maintain a predetermined distance between the mover unit 10 and elongated reference 12. Sensor units 30 may be mounted on sensor support arms 40 which are connected to the wheel axles 36 which are nearest the elongated reference 12. In operation, the leading sensor 30 at each wheel location is selected to provide an input signal, the leading sensor being determined by the direction of travel of mover unit 10. Electrical output lines 32 from each sensor 30, conveniently carried in cable bundle 33 mounted on frame 34, provide a plurality of output signals from each sensor 30 as inputs to control unit 24.

Electrical outputs 32 from sensors 30 are used to control the steering mechanisms 44 and 42 and control the position of mover unit 10 relative to elongated reference 12. Tie rods 37 connect the pair of wheel axles 36 at each end of mover unit 10 so that simultaneous movement of each pair of wheels 38 will occur. Steering actuators 42 and 44 may conveniently take the form of hydraulically-actuated pistons which are actuated through hydraulic output lines 45, which may conveniently be interconnected with the output of the water pump (not shown) contained in engine section 22. Actuators 42 initiate movement of mover unit 10 away from elongated reference 12, whereas actuators 44 initiate movement toward elongated reference 12. In a preferred embodiment, a sensor 30 will activate the steering mechanism for the pair of wheels 33 on which it is mounted. In this manner, each end of mover unit 10 will move toward or away from elongated reference 12 as determined from the outputs from sensors 30. A particular displacement sensor contemplated as part of the present invention may be seen by reference to FIG. 3, as more particularly hereinafter discussed.

In FIG. 2 there may also be seen engine section 22 which is depicted in block form. Engine section 22 may contain a motor powered by conventional fuel sources such as gasoline, butane, diesel fuel, etc. and interconnected with a conventional generator for supplying electrical energy to power mover unit 10 and other mover units interconnected therewith. The engine may be conventionally connected to a pump via a power take-off unit to provide a pressurized supply of water to the irrigation pipe spans for suitable distribution through sprinklers to the land area. A portion of the pump output may be diverted through hydraulic lines 45 to activate steering actuators 42 and 44, as hereinabove discussed. The output from the electrical generator is supplied to electrical motors for powering the mover units, and may be controlled as hereinbelow discussed to maintain movement of the irrigation system across the land area. Referring again to FIG. 2, there may be seen a pressurized water supply pipe 26, connected to the output of the pump and engine section 22 and suitably supported on frame 34 by a tower-like support structure (not shown). Water pipe 26 is connected to pivot section 28 and thereafter interconnected with irrigation pipe span 16. Pivot 28 defines a reference point with respect to the plurality of irrigation pipe spans 16 which extend outwardly from pivot 28 and which interconnect with mover unit 18, as depicted in FIG. 1. As hereinafter described, the rotation of irrigation pipe spans 16 about pivot 28 is measured by rotary transducer 50 which provides an output signal 52 which is functionally related to the amount of angular rotation of irrigation pipe span 16 about pivot 28.

Pivot 28 is mounted on frame 34 so that pivot 28 may be deflected along the line of the interconnected irrigation pipe span 16. The direction and amount of deflection of pivot 28 is functionally related to the tension and compression stress forces which occur in the string of interconnected irrigation pipe spans 16. Control of these stress forces is important to maintaining control of the irrigation system, as more fully discussed hereinbelow. The deflection of pivot 28 is detected by deflection linkage 54 and translated into a rotary movement which is detected by deflection rotary transducer 56. Deflection transducer 56 thereby provides an electrical output signal 58 which is functionally related to the magnitude and direction of the stresses which are obtained in the interconnected irrigation pipe spans 16.

The extending irrigation pipe spans 16 must be maintained in a relationship to adjacent pipe spans to permit movement about pivot 28 to functionally represent the condition of the entire pipe string. Such a relationship is maintained by sensing the angular relationship between adjacent pipe spans and controlling the intermediate mobile bases 17, as shown in FIG. 1, to correct misalignment on a span-to-span basis. The intermediate mobile bases 17 are normally energized and then controllably de-energized to maintain each span 16 within a preselected angular relationship with adjacent spans. The entire extending pipe string is thereby maintained as a substantially straight line so that pivot 28 may be used as an appropriate reference.

The outputs 52 and 58 from pivot rotation transducer 50 and deflection transducer 56, respectively, are provided as inputs to control unit 24 to obtain a first output 60 to control the motor of inboard mover unit 10 and a second output 62 which controls the motor of outboard mover unit 18 which is displaced from mover unit 10.

It is readily apparent from the foregoing discussion that, according to the present invention, movement of the irrigation system in a controlled fashion is accomplished by first steering mover unit 10 with respect to an elongated reference 12 to independently establish the track of mover unit 10 across the land area which is to be irrigated. The interconnected plurality of irrigation pipe spans 16 is then maintained in a controlled relationship with respect to mover unit 10 by controlling mover unit 18 which may conveniently be located near the end of the interconnected spans of irrigation pipe. As fully discussed hereinbelow for FIGS. 4 and 5, the relationship between the extending irrigation pipe spans and the steerable mover unit 10 permits the string of irrigation pipe to be maintained in a generally perpendicualr relationship with respect to elongated reference 12 and yet allow some variation in its angular relationship to provide corrective movement which relieves stresses occurring along the interconnected pipe spans.

Referring now to FIG. 3, there is shown displacement sensor 30 according to one embodiment of the present invention. Displacement sensor 30 includes an elongated sensor support member 70 which is mounted on mover unit 10 by pivotally connecting elongated sensor support member 70 to displacement sensor support 40. Elongated sensor support 70 is eccentrically mounted at pivot 78 to displacement sensor support frame 40. The eccentric location of pivot 78 is provided so that elongated sensor support 70 will assume a preselected angle with respect to the vertical when in a free hanging condition. As explained below, the free hanging angle is a limit which determines a maximum displacement of mover unit 10 from elongated reference 12.

As mover unit 10 traverses the land area to be irrigated, sensor support member 70 contacts elongated reference 12 and rotates about pivot 78 as mover unit 10 moves variably in relationship to its displacement from elongated reference 12. A plurality of switches are mounted on elongated reference 70 which are selectively energized to detect the angular position of elongated sensor support 70. As depicted in FIG. 3, switches 72, 74 and 76 illustrate the relationship of switch outputs to various angular conditions.

Position A of FIG. 3 depicts movement of mover unit 10 toward elongated reference 12. Switches 76 and 74, which may conveniently take the form of mercury limit switches in which contact is completed when mercury pools in one end or the other, are rotated so as to complete the circuits connected therewith (not shown). Switch 72 has moved to a level position where the mercury is pooled in an intermediate location so that contact is not made at either end of switch 72. The output from switches 76 and 74 may be used to activate the steering mechanism as hereinabove discussed to steer mover unit 10 away from elongated reference 12 until elongated sensor support 70 reaches position B. At condition B, sensors 76 and 72 now have completed electrical contacts and sensor 74 is in the intermediate condition. The output from the position B condition may be used to activate the steering mechanism to return the wheels to a neutral position. If mover unit 10 begins to drift away from elongated reference 12, elongated sensor support 70 tends to swing toward elongated reference 12 as a result of the eccentric mounting of support 70 about pivot 78. This movement may continue until a condition C is reached where switches 74 and 72 are closed and switch 76 is in an intermediate position. This condition may be used to actuate the steering mechanism to mover unit 10 toward the elongated reference 12 until a position B condition is again obtained.

Displacement reference sensor 30 is also used as a means to shut down the irrigation system if movement of the mover unit 10 toward or away from elongated reference 12 exceeds a preselected value. This preselected value may be determined by the free hanging angle of eccentrically mounted sensor support 70 so that in the free hanging condition switches 72, 74 and 76 are all closed. Conversely, if mover unit 10 approaches elongated reference 12 so that the angular displacement equals that of the free hanging angle, switches 72, 74 and 76 all close and system operation will again terminate until manual correction is obtained. The above-described displacement sensor assembly, which is a part of the present invention, may be seen to be a device which is simply constructed but which is capable of providing output signals indicative of a variety of displacement conditions, including a fail-safe shut down signal. The position of mover unit 10 may be controlled within relatively narrow limits with respect to elongated reference 12. It will be noted that the system is also well adapted to tracking curves defined by elongated reference 12 as the land area is traversed. Elongated reference 12 may also be the edge of a water canal constructed to extend above the ground a distance sufficient to engage elongated support member 70.

As mover unit 10 tracks along elongated reference 12, the plurality of interconnected irrigation pipe spans 16 which are interconnected between the mobile pivot 28 of inboard mover unit 10 and outboard mover unit 18 are moved along the area to be irrigated as mover units 10 and 18 are powered over the land area. It will be appreciated that the distance between inboard mover unit 10 and outboard mover unit 18 can be quite large and may approach a quarter of a mile in the largest irrigation systems. This extending pipe string may tend to lead or lag the movement of mover unit 10 so as to produce a relative rotation of extending pipe span 16 about mobile pivot 28. This relative rotation is detected by rotary transducer 50 and translated into electrical signal 52 which is functionally related to the magnitude and direction of rotation with respect to some reference position, which may conveniently be an imaginary line generally vertical to the direction of movement of mover unit 10. It is desirable to maintain this angle of rotation as small as possible in order to maximize the coverage of the irrigation system and to minimize the drag which is exerted on the irrigation pipe spans 16.

In addition to relative angular movement about mobile pivot 28, the position of outboard mover unit 18 with respect to inboard mover unit 10 may vary slightly in distance as the land area is traversed. This variation in distance along the interconnected irrigation pipe span 16 introduces stresses in the pipe spans 16, which may be either in tension or compression as mover unit 18 moves either toward or away from mover unit 10, respectively. These stress forces must be measured and corrective action taken to relieve the stresses before damage to the irrigation system occurs. In one embodiment of the present invention, the stresses produce a lateral deflection of pivot 28. This lateral deflection is detected by linkage 54, as hereinabove discussed, and translated into an output signal 58 from rotary transducer 56 functionally related to the stress vector within irrigation pipe spans 16.

THEORY

The basic mechanism for controlling the relationship between the two mover units and, therefore, the rotation of the irrigation spans about the mobile pivot point and the stress in the irrigation spans, is to control the average speed of each mover unit. The average speed may be controlled in a variety of ways, depending on whether the drive motors are AC or DC motors. If AC motors are used, the average speed may then be varied by either varying the frequency of the power supply or varying the time period during which energy is supplied to the motors. Although both methods are considered to be within the contemplation of the present invention, the preferred embodiment discussed hereinbelow involved the selected energizing of the motors which power the inboard and outboard mover units.

Referring now to FIG. 4, there may be seen a schematic of the system parameters which are monitored to control movement of the inboard 10 and outboard 18 mover units. The point of reference is pivot 28 on inboard mover unit 10. Stresses in the irrigation pipe spans result in deflection, ±D, of pivot 28. The direction of the deflection, D, defines the nature of the stress as either compression or tension. The amount of deflection, D, is functionally related to the magnitude of the stress forces in the irrigation spans 16.

Rotation of the irrigation spans 16 is also measured relative to pivot 28. This angular rotation, ±θ, represents the lead or lag of the extending pipe spans with respect to mover unit 10. Hence, the entire extending irrigation system is controlled with reference to pivot 28, which reference is mobile with the controlled movement of mover unit 10 along an elongated reference.

The deflection and rotation input parameters are then maintained within selected values by controlling movement of outboard mover unit 18 relative to inboard unit 10. Specifically, a duty cycle is computed for operating the motor of each mover unit to obtain the desired relative movements. If the duty cycle of the inboard mover unit 10 is chosen to be Tp, then the duty cycle of the outboard mover unit will be defined to be $$Te = Tp - \Delta T.$$

ΔT is calculated from the input parameters as $$\Delta T = f[A(D) + B(\theta)] = Tp - Te$$

where A and B are constants which weight input parameters D and θ, respectively. ΔT may be maintained within preselected limits by varying the duty cycle Te of outboard mover unit 18. If necessary, the duty cycle Tp of inboard mover unit 10 can be varied to correct a large deviation.

FIG. 5 shows a flow diagram of information through a control unit, hereinafter discussed as FIG. 7. The basic inputs (D, θ) are first examined. If D≠O, an angular correction is computed to return D in a correcting direction. Once D=O, the resulting angle θ is then examined. An angular correction is then generated to return θ toward a neutral reference condition. To provide the necessary angular corrections, the motor duty cycles (Te, Tp) for the respective mover units are determined for the next time interval. The motors are then energized for proportionate times to obtain the desired relative movement.

FIG. 6 is a graphic representation of the various relationships which may occur between inboard mover unit 10, whose movement is depicted at time intervals denoted by Tp and outboard mover unit 18, whose movement is denoted at time intervals Te.

Referring now to FIG. 6, at time To, the string of pipe spans is lagging movement of the inboard mover unit. To correct this condition over the next timing interval, the outboard mover unit is energized for a time period Te1 and the inboard mover unit is energized for a shorter time period Tp1 so as to partially correct the rotational variance by time T1. A correction is still required at time T1 so the outboard unit is again energized for a time interval Te2 and the inboard unit for a time interval Tp2, which is less than Te2. Accordingly, the selective energizing of the mover units has caused the angular discrepancy to be corrected by time T2 so that the next duty cycles, Te3 and Tp3, are equal and the units advance the same distance along the land areas without rotation about the inboard pivot point.

At time T4, there may be seen a condition of tension in the irrigation pipe spans as indicated by lateral displacement of the outboard mover unit away from the inboard mover unit and detected by a lateral displacement of the inboard pivot point, as hereinabove discussed. In order to reduce the tension, the outboard unit must be caused to move toward the inboard unit and this relative movement is obtained by energizing the outboard unit for a time period Te4 and the inboard unit for a time period Tp4, which is less than Te4. Accordingly, at T5, the outboard unit has moved somewhat toward the inboard unit and thereby relieved compression in the string of irrigation pipe spans.

Referring again to FIG. 6, there is depicted at time T6 a condition where the outboard mover unit has moved ahead of the inboard mover unit. This rotation is detected by the pivot rotary transducer and a control signal is provided to energize the inboard mover unit for a time period Tp6 and the outboard unit for a time period Te6, which is less than Tp6, whereby the leading condition is partially corrected by time T7. Since a deviant condition still exists at time T7, the inboard unit is again energized for a time interval longer than the outboard unit in order to obtain a corrected condition at T8. A control unit, hereinafter discussed, senses the corrected angular relationship and thereby causes the inboard and outboard units to be energized for equal time intervals Tp8 and Te8, respectively.

At time T9 there is depicted a condition of compression in the irrigation pipe spans where the outboard unit has moved toward the inboard unit. Again, the lateral deflection of the pivot point is detected and an output signal is provided which energizes the inboard unit for a time interval Te9, which is less than Tp9. This results in the outboard unit slightly lagging the inboard unit and thereby tending to increase the displacement between the two mover units to reduce the compression in the irrigation pipe spans. Again, an allowable rotation is obtained in order to correct these stresses in the irrigation pipe spans.

In FIG. 7 there is depicted in schematic block diagram form a control system which monitors electrical signal inputs from the transducers located on the inboard mover unit 10 and thereafter derives duty cycles for the inboard mover unit 10 and outboard mover unit 18 drive motors. In particular, the proportional motor control system 80 receives inputs relating to the condition of the extending irrigation pipe span 16 relative to pivot 28, as shown in FIG. 1. Rotation of the extending irrigation pipe section 16 about pivot 28 is detected by rotary transducer 50, which provides an output signal which is functionally related to the magnitude and direction of this rotation. The lateral deflection of the pivot 28 is functionally related to the magnitude and direction of stresses which are developed in the irrigation pipe spans and this lateral deflection is detected by a deflection linkage to cause rotation of deflection transducer 56, which produces an output signal functionally related to the stress in the irrigation pipe spans.

The output signals from transducers 50 and 56 are each input to the proportional motor control system 80 through operational amplifiers 81. Each signal is input to analog multiplexer 82 which selectively presents either the rotation analog signal or the stress analog signal through operational amplifier 85 to analog-to-digital converter 86. The desired input is selected for presentation by control unit 84. Analog-to-digital converter 86 receives the output from amplifier 85, which is typically an analog voltage of zero to two volts and converts the voltage input to a digital output. The output from analog-to-digital converter 86 is presented to data bus 90 through buffers 87 which isolate the converter 86 from the data bus 90.

As hereinabove discussed, each of the input signals must be weighted in order to obtain the desired overall system response. Accordingly, switches 92 and 93 are provided, which are a portion of a dual inline package whose output can be varied and thereby provide the desired constant weighting output.

In addition to the primary system parameters, other input information is provided to data bus 90 for overall system control. A speed selector switch 95 is used to vary the average speeds of both the inboard and outboard mover units simultaneously. The selected average speed representation is presented from speed switch 95 through buffer 96 to data bus 90. Yet another data input is provided to monitor the condition of various switches 98 throughout the irrigation system. Switch data 98 is provided to optical isolator 99 to prevent system anamolies, such as voltage spikes resulting from static and sparks, from passing through to data bus 90. Buffer 96 interconnects the data from optical isolator 99 to data bus 90. As hereinafter explained, particular input data is selected for presentation to the data bus 90 in a programmed sequence and each input unit receives an enabling signal which directs the input to be presented to data bus 90.

The input signals on data bus 90 are then presented to the computational portion of the control unit through buffer 101 to bus driver and controller 102. Bus driver 102 can transmit data signals either from the data bus 90 to a processing unit or accept signals from processing unit and transmit data back along data bus 90. Bus driver 102 also includes a control unit which provides enabling signals to various system components to obtain sequential presentation of inputs to the system and the acceptance of outputs from the system.

Input data on data bus 90 is presented to central processing unit 104. Central processing unit 104 is, in essence, a mini-computer which is preprogrammed to provide a variety of processing functions. Central processing unit 104 is driven by clock 105 to obtain and evaluate data in a preselected sequence. Clock 105 also provides an output pulse train which is used to control the mover unit motors, as hereinbelow discussed. Additional system components are interconnected with central processing unit 104 to assist the processor 104 in its computations.

As central processing unit 104 is clocked through its program sequence, information from memory units external to central processing unit 104 must be called for use and intermediate calculational results must be returned to memory units for temporary storage. Two different types of memory units are required to assist central processing unit 104. A first programmable, read only, memory unit 112 is utilized to instruct central processing unit 104 on the calculational steps needed to process the input data. Programmable memory units 112 are not used for intermediate storage, but store preprogrammed data and instructions for the central processing unit 104. Readable and addressable memory units 114 are provided for intermediate data storage locations. Readable memories 114 can accept data for intermediate storage and thereafter present the stored data to data bus 90 for further use in the data processing.

Central processing unit 104 selectively addresses the programmable memory units 112 and addressable memory units 114 along address bus 106. In addition, a decoder 110 is connected to address bus 106 and provides a plurality of outputs which enable the various memory units to accept or transfer data along data bus 90. Other decoder units 116 are connected to address bus 106 for providing data input and output enabling signals which enable the various data input and output units to respond to the data on data bus 90. The input and output control units 116 are further selectively enabled by output signals from bus driver and controller 102 as data is being selected for input to the system and control signals are being selected for output from the system.

Clock generator 105 also provides another output to pulse generator 115. Pulse generator 115 divides the high frequency output from clock 105 to obtain a train of pulses of 20 millisecond (ms) duration. The 20 ms pulse output from generator 115 is presented to central processing unit 104 along data bus 90 and acts as the basic control timing pulse chain.

As hereinabove discussed, central processing unit 104 computes the duty cycle for each mover unit based on the input parameters. Central processing unit 104 then counts the 20 ms pulses from pulse generator 115 and provides an output signal to energize each mover unit until the pulse count reaches the count corresponding to the computed duty cycle. Thus, each duty cycle is computed for the next minute to a 20 ms precision.

After central processing unit 104 has completed its calculations, the output motor control signals are impressed on data bus 90 and driven along by bus driver 102 through buffer 101 for presentation to output registers 118. When enabled by signals from control units 116, registers 118 accept the data presented along data bus 90. The proportional motor control signals are then presented to optical isolators 120 and then to solid state relay 122 for actual motor control. Optical isolator 120 isolates the incoming data from the actual motor control system in order to prevent spurious electrical noise from interfering with the control system. Solid state relay 122 receives the control information and energizes the motors 124 on the mover units for the duty cycle which has been calculated for each particular mover unit over a selected data interval. Typically, a one minute data interval may be used and a duty cycle of all, or a calculated portion, of that minute will be computed and used to energize the respective mover units to obtain the required system response.

It will be understood that a variety of available components may be utilized to perform the functions described for each of the diagram blocks in FIG. 7. By way of example, suitable integrated circuits for the central processing unit 104, clock/generator drive 105, bus driver and controller 102, programmable read only memories 112, readable-addressable memories 114, and others are described in a catalog from Intel Corporation of September, 1975, and entitled 8080 Microcomputer Systems User's Manual.

In view of the foregoing, it is apparent that there has been provided a unique method and apparatus for accomplishing irrigation of large land areas, wherein irrigation apparatus is employed that is not tethered to a physical structure, but rather moves over a land area within limits bounded by allowable error boundaries defined along an ideal intended track. Through utilization of irrigation apparatus in accordance with the present invention, it is practical to accomplish irrigation of greater tracts of land than heretofore provided. Moreover, it is not necessary to provide specific guideways for each of the various movable powers of the irrigation system in order to control lateral movement of these systems over a particular land area. By appropriate control, the irrigation system of the present invention can be caused to move laterally and to pivot in such a manner that it will automatically track along a guide structure that is not straight or is irregularly curved. Accordingly, the present invention is well adapted to attain all of the objects and advantages hereinabove set forth, together with other advantages that will become apparent and obvious from a description of the apparatus itself. It will be understood that certain combinations and subcombinations are of utility and may be employed without reference to other features and subcombinations. This is contemplated by and is within the spirit and scope of the present invention.

What is claimed is:

1. An irrigation system for irrigating large land areas and being movable in a substantially linear manner across the land area, said irrigation system comprising:
   an elongated reference means establishing a travel path across said land area;
   an inboard motorized steerable mover unit adjacent said elongated reference means and defining a reference pivot point;
   an outboard motorized mover unit displaced from said inboard steerable mover unit;
   a plurality of irrigation pipe spans interconnecting said outboard mover unit with said inboard steerable mover unit and rotating about said pivot point;
   means for steering said inboard steerable mover unit to maintain a preselected relationship between said inboard steerable mover unit and said elongated reference;
   motor control means for selectively energizing said inboard and outboard mover units to maintain the rotation of said outboard mover unit about said reference pivot point within predetermined values;
   a support member pivotally mounted on said inboard mover unit for engaging said elongated reference means and having a center of gravity eccentric with respect to said support member mounting;
   sensor means attached to said pivotally mounted support for obtaining an electrical signal functionally relating the distance between said support member pivotal mounting and said elongated reference means to the angular relationship between said support member and a preselected reference;
   mobile support means attached to said inboard mover unit for effecting steering and movement of said first mover unit; and
   steering control means responsive to said distance representation for actuating said mobile support means to cause movement of said inboard mover unit in a direction to maintain said distance representation within preselected limits.

2. An irrigation system as described in claim 1, wherein said sensor means includes a plurality of limit switches mounted on said support member for activation in a sequence functionally related to the angle between said support member and said preselected reference.

3. An irrigation system as described in claim 2, further including means for de-energizing said inboard and outboard mover units when said electrical distance representation exceeds a preselected value.

4. An irrigation system for irrigating large land areas and being movable in a substantially linear manner across the land area, said irrigation system comprising:
   an elongated reference means establishing a travel path across said land area;
   an inboard motorized steerable mover unit adjacent said elongated reference means and defining a reference pivot point;
   an outboard motorized mover unit displaced from said inboard steerable mover unit;
   a plurality of irrigation pipe spans interconnecting said outboard mover unit with said inboard steerable mover unit and rotating about said pivot point;
   means for steering said inboard steerable mover unit to maintain a preselected relationship between said inboard steerable mover unit and said elongated reference;
   motor control means for selectively energizing said inboard and outboard mover units to maintain the rotation of said outboard mover unit about said reference pivot point within predetermined values, said motor control means including:
      angle indicator means for deriving a first variable electrical signal functionally related to the angular position of said outboard mover unit about said reference pivot point and relative to said inboard mover unit variable;
      tension and compression sensing means for deriving a second variable electrical signal functionally related to compression and tension forces acting along said plurality of irrigation pipe spans;
      means for proportionately energizing said inboard and outboard mover units in response to the compression and tension signals to induce correcting movement of at least one of said outboard mover units to maintain said second electrical signal within predetermined values; and
      means for thereafter proportionately energizing said inboard and outboard mover units in response to said angular position signal to induce correcting movement of said inboard and outboard mover units to return said first electrical signal within predetermined values;
   sensor means mounted on said inboard mover unit and having movement relative to said inboard mover unit to seek distance relating engagement with said reference means;
   means sensing the mechanical relationship of said sensor means relative to said mover unit and deriving an electrical representation of said mechanical relationship and thus the distance between said elongated reference means and said inboard mover unit;
   mobile support means attached to said inboard mover unit for effecting steering and movement of said first mover unit; and
   steering control means responsive to said mechanical relationship and distance representation for actuating said mobile support means to cause movement of said inboard mover unit in a direction to maintain said distance representation within preselected limits.

5. An irrigation system as described in claim 4 wherein said means for deriving said first electrical signal is a first rotary transducer mounted on said inboard mover unit for detecting rotation of said irrigation pipe spans interconnecting said inboard and outboard mover units about said reference pivot point.

6. An irrigation system as described in claim 5, wherein said means for deriving said second electrical signal includes:
  a second rotary transducer; and
  mechanical linkage for detecting lateral movement of said reference pivot point resulting from stress forces in said interconnected irrigation pipe spans and converting said lateral movement into a rotary input to said second rotary transducer.

7. An irrigation system as described in claim 6, wherein said means for energizing said inboard and outboard mover units to maintain said second electrical signal with predetermined values includes:
  means for selectively processing said second electrical signal;
  means for electrically comparing said second electrical signal with a preselected electrical signal; and
  means for electrically deriving first and second output signals energizing said inboard and outboard mover units respectively to produce relative movement between said inboard and outboard mover units until said second electrical signal is within a selected value.

8. An irrigation system as described in claim 7, wherein said first and second output signals energize said inboard and outboard mover units respectively for time periods derived to produce variable average speeds in said inboard and outboard mover units to maintain said second electrical signal within said selected value.

9. A method for irrigating large land areas by controllably moving an irrigation system in a substantially linear manner across the land area, said method comprising the steps of:
  establishing an elongated reference defining a travel path across said land area;
  moving an inboard motorized steerable mover unit defining a reference pivot point adjacent said elongated reference means;
  moving an outboard motorized mover unit displaced from said inboard steerable mover unit and interconnected with said inboard steerable mover unit by a plurality of irrigation pipe spans rotating about said pivot point;
  steering said inboard steerable mover unit to maintain a preselected distance between said inboard mover unit and said elongated reference;
  selectively energizing said inboard and outboard mover units to maintain the rotation of said outboard mover unit about said reference pivot point within predetermined values;
  engaging said elongated reference means with a support member pivotally mounted on said inboard mover unit and having a center of gravity eccentric with respect to said support member mounting; and
  providing an electrical signal from sensor means attached to said pivotally mounted support functionally relating the distance between said support member pivotal mounting and said elongated reference means to the angular relationship between said support member and a preselected reference; and
  electrically actuating steering control means in response to said distance representation inducing movement of said inboard mover unit in a direction which maintains said distance representation within preselected limits.

10. A method as described in claim 9, wherein providing said electrical signal functionally related to said distance includes activating switches mounted on said support member in a sequence functionally related to the angle between said support member and said preselected reference.

11. A method as described in claim 10, further including the step of de-energizing said inboard and outboard mover units when said electrical distance representation exceeds a preselected value.

12. A method for irrigating large land areas by controllably moving an irrigation system in a substantially linear manner across the land area, said method comprising the steps of:
  establishing an elongated reference defining a travel path across said land area;
  moving an inboard motorized steerable mover unit defining a reference pivot point adjacent said elongated reference means;
  moving an outboard motorized mover unit displaced from said inboard steerable mover unit and interconnected with said inboard steerable mover unit by a plurality of irrigation pipe spans rotating about said pivot point;
  steering said inboard steerable mover unit to maintain a preselected distance between said inboard mover unit and said elongated reference;
  selectively energizing said inboard and outboard mover units to maintain the rotation of said outboard mover unit about said reference pivot point within predetermined values by the steps of:
    detecting an angular relationship of said outboard mover unit relative to said inboard mover unit and deriving a first electrical signal functionally related to the angular position of said outboard mover unit relative to said reference pivot point;
    detecting compression and tension forces between said inboard and outboard mover units and deriving a second electrical signal functionally related to said compression and tension forces acting along said plurality of irrigation pipe spans;
    proportionately energizing said inboard and outboard mover units to correct for said compression and tension forces and maintain said second electrical signal within predetermined values; and
    thereafter proportionately energizing said inboard and outboard mover units to correct for angular misalignment of said inboard and outboard mover units to return said first electrical signal within predetermined values;
  moving a distance sensor into sensing contact with said elongated reference;
  generating an electrical representation of the position of said distance sensor relative to said inboard motorized steerable mover unit, said electrical representation indicating the distance between said elongated reference means and said inboard mover unit; and electrically actuating steering control means in response to said distance representation inducing movement of said inboard mover unit in a direction which maintains said distance representation within preselected limits.

13. A method as described in claim 12, wherein deriving said first electrical signal includes detecting the output of a first rotary transducer mounted on said first mover unit for measuring the rotation of said irrigation pipe spans interconnecting said inboard and outboard mover units about said reference pivot point.

14. A method as described in claim 13, wherein deriving said second electrical signal includes the steps of:
detecting lateral movement of said reference pivot point resulting from stress forces in said interconnected irrigation pipe spans;
converting said lateral movement into a rotary input to a second rotary transducer; and
detecting the output of said second rotary transducer.

15. A method as described in claim 14, wherein energizing said inboard and outboard mover units to maintain said second electrical signal within predetermined values includes the steps of:
selectively monitoring said second electrical signal;
electrically comparing said second electrical signal with a preselected electrical signal; and
electrically deriving first and second output signal energizing said inboard and outboard mover units respectively to produce relative movement between said inboard and outboard mover units until said second electrical signal is within preselected values.

16. A method as described in claim 15, further including the step of energizing said inboard and outboard mover units for time periods represented by said first and second output signals respectively to produce variable average speeds in said inboard and outboard mover units to maintain said second electrical signal within said preselected values.

17. An irrigation system for irrigating large land areas and being movable in a substantially linear manner across the land area, said irrigation system comprising:
an elongated reference means establishing a travel path across said land area;
an inboard motorized steerable mover unit adjacent said elongated reference means and defining a reference pivot point;
an outboard motorized mover unit displaced from said inboard steerable mover unit;
a plurality of irrigation pipe spans interconnecting said outboard mover unit with said inboard mover unit and rotating about said pivot point;
sensor means mounted on said inboard mover unit and having movement relative to said inboard mover unit to seek distance relating engagement with said reference means;
means sensing the mechanical relationship of said sensor relative to said mover unit and deriving an electrical representation of said mechanical relationship and thus the distance between said elongated reference means and said inboard mover unit;
wheels attached to said inboard mover unit for effecting steering and movement of said inboard mover unit;
steering control means responsive to said mechanical relationship and distance representation for rotating at least one of said wheels to cause movement of said inboard mover unit in a direction to maintain said distance representation within preselected limits;
angle indicator means for deriving a first variable electrical signal functionally related to the angular position of said outboard mover unit about said reference pivot point and relative to said inboard mover unit;
tension and compression means for deriving a second variable electrical signal functionally related to compression and tension forces acting along said plurality of irrigation pipe spans;
means for proportionately energizing said inboard and outboard mover units in response to the compression and tension signals to induce correcting movement of at least one of said outboard mover units to maintain said second electrical signal within preselected values; and
means for thereafter proportionately energizing said inboard and outboard mover units in response to said angular position signal to induce correcting movement of said inboard and outboard mover units to return said first electrical signal within predetermined values.

18. An irrigation system as described in claim 17, wherein said means for deriving said first electrical signal is a first rotary transducer mounted on said inboard mover unit for detecting rotation of said irrigation pipe spans interconnecting said inboard and outboard mover units about said reference pivot point.

19. An irrigation system as described in claim 18, wherein said means for deriving said second electrical signal includes:
a second rotary transducer; and
mechanical linkage for detecting lateral movement of said reference pivot point resulting from stress forces in said interconnected irrigation pipe spans and converting said lateral movement into a rotary input to said second rotary transducer.

20. An irrigation system as described in claim 19, wherein said means for energizing said inboard and outboard mover units to maintain said second electrical signal within predetermined values includes:
means for selectively processing said second electrical signal;
means for electrically comparing said second electrical signal with a preselected electrical signal; and
means for electrically deriving first and second output signals energizing said inboard and outboard mover units respectively to produce relative movement between said inboard and outboard mover units respectively to produce relative movement between said inboard and outboard mover units until said second electrical signal is within a preselected value.

21. An irrigation system as described in claim 20, wherein said first and second output signals energize said inboard and outboard mover units respectively for time periods derived to produce variable average speeds in said inboard and outboard mover units to maintain said second electrical signal within said preselected value.

22. An irrigation system for irrigating large land areas and being movable in a substantially linear manner across the land area, said irrigation system comprising:
an elongated reference means establishing a travel path across said land area;

an inboard motorized steerable mover unit adjacent said elongated reference means and defining a reference pivot point;

an outboard motorized mover unit displaced from said inboard steerable mover unit;

a plurality of irrigation pipe spans interconnecting said outboard mover unit with said inboard mover unit and rotating about said pivot point;

means for deriving an electrical representation of a distance between said elongated reference means and said inboard mover unit;

wheels attached to said inboard mover unit for effecting steering and movement of said inboard mover unit;

steering control means responsive to said distance representation for rotating at least one of said wheels to cause movement of said inboard mover unit in a direction to maintain said distance representation within preselected limits;

means for deriving a first electrical signal functionally related to the rotation of said outboard mover unit about said reference pivot point;

means for deriving a second electrical signal functionally related to stress forces acting along said plurality of irrigation pipe spans;

means for proportionately energizing said inboard and outboard mover units to maintain said second electrical signal within preselected values;

means for thereafter proportionately energizing said inboard and outboard mover units to return said first electrical signal within predetermined values;

a support member pivotally mounted on said inboard mover unit for engaging said elongated reference means and having a center of gravity eccentric with respect to said support member mounting; and sensor means attached to said pivotally mounted support for obtaining an electrical signal functionally relating the distance between said support member pivotal mounting and said elongated reference means to the angular relationship between said support member and a preselected reference.

23. An irrigation system as described in claim 22, wherein said sensor means includes a plurality of mercury limit switches mounted on said support member for activation in a sequence functionally related to the angle between said support member and said preselected reference.

24. An irrigation system as described in claim 23, further including means for de-energizing said inboard and outboard mover units when said electrical distance representation exceeds a preselected value.

* * * * *